W. T. Mersereau,
Curtain Cord Tightener,
N° 69,572. Patented Oct. 8, 1867.

Witnesses.
James Pouge
James W. Beard

Inventor:
W. T. Mersereau by his Att'y
Sidney Doves

United States Patent Office.

WILLIAM T. MERSEREAU, OF NEWARK, NEW JERSEY.

*Letters Patent No. 69,572, dated October 8, 1867.*

IMPROVED CURTAIN-FIXTURE.

*The Schedule referred to in these Letters Patent and making part of the same.*

TO ALL WHOM IT MAY CONCERN:

Be it known that I, WILLIAM T. MERSEREAU, of Newark, in the county of Essex, State of New Jersey, have invented, made, and applied to use a new and improved Shade-Fixture; and I do declare the following to be a full, clear, and correct description of my invention, reference being had to the accompanying drawings, and to the letters of reference marked thereon, in which—

Figure 1:
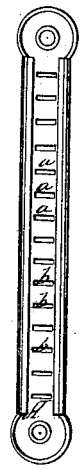

Figure 1 is a view of the rack provided with the cap-like projections used by me.

Figure 2:

Figure 2, a view of my improved shade-fixture complete.

Figure 3:

Figure 3, a view of the knob and pulley with its attachments.

In the drawings, like parts of the invention are pointed out by the same letters of reference.

The nature of my invention consists in the construction and operation, as more fully hereinafter described of a new and useful shade-fixture, for holding window-shades in any desired position.

The object of the present invention is to produce an article of shade-fixture accomplishing its purpose more thoroughly than those at present in use, yet not too complicated to be readily understood and operated, and one that can be afforded at a comparatively low price to the consumer.

To enable those skilled in the arts to make and use my invention, I will proceed to describe the same.

A shows a rack of metal, of any desired length, provided on its face with the cap-like projections $a$ and openings $b$, the metal being pierced and raised in the process of manufacture so that these openings and projections shall be formed. The sides of this rack or plate are rolled or turned over, so as to allow the curved plate B, to which are attached the knob and pulley, as hereinafter described, to be inserted between them and the face of the rack, and to be moved freely up and down within the same. B is a curved plate of metal, to which is attached a spindle, C, having upon it, directly in front of the curved plate B, the knob and pulley, formed of porcelain or any desired material, over which the cord, for operating the shade or curtain, is passed. D is an upright spring, held upon the spindle C, and placed behind the curved plate B, against which it bears. The upper end of this spring is slightly curved, and has attached to it the lip $d$ and handle E.

My improved shade-fixture being thus constructed, its operation may be thus described:

The rack or plate A is fastened to the window-casing at any convenient point, the knob and pulley with its attachments having been inserted within the same. The cord passed over the roller, upon which the window-shade or curtain is fastened, is passed over this knob and pulley. When desired to tighten the cord to hold the curtain in any desired position, the knob and pulley, with its attachments, is depressed until it reaches the proper point, when the lip upon the spring is allowed to drop into one of the openings in the rack or plate, when the knob and pulley will be held in the proper position, the cap-shaped projections upon the face of the metal projecting partially over the openings, and tending to aid the retention of the lip within the same. When desired to depress the knob and pulley, the handle upon the spring is grasped, by which the lip can be readily released from its position within any of the openings, and the knob and pulley be depressed as desired, and when necessary to raise the knob and pulley, the operation is, as just described, by seizing the handle and releasing the lip. The knob and pulley, which have heretofore been made separately, are, in the present instance, combined and made together, reducing the cost of manufacture, and making the fixture much more ornamental.

Having thus described my invention, what I claim as new, and desire to secure by Letters Patent, is—

I claim combining, with the knob and pulley, the circular plate, spring, and rack provided with the cap-like projections, for the purposes set forth.

WM. T. MERSEREAU.

Witnesses:
O. SIDNEY DRANE,
JAMES POUGE.